May 17, 1966 A. KLEIN 3,251,701
EXPANSIVE AND SHRINKAGE-COMPENSATED CEMENTS
Filed Sept. 24, 1964
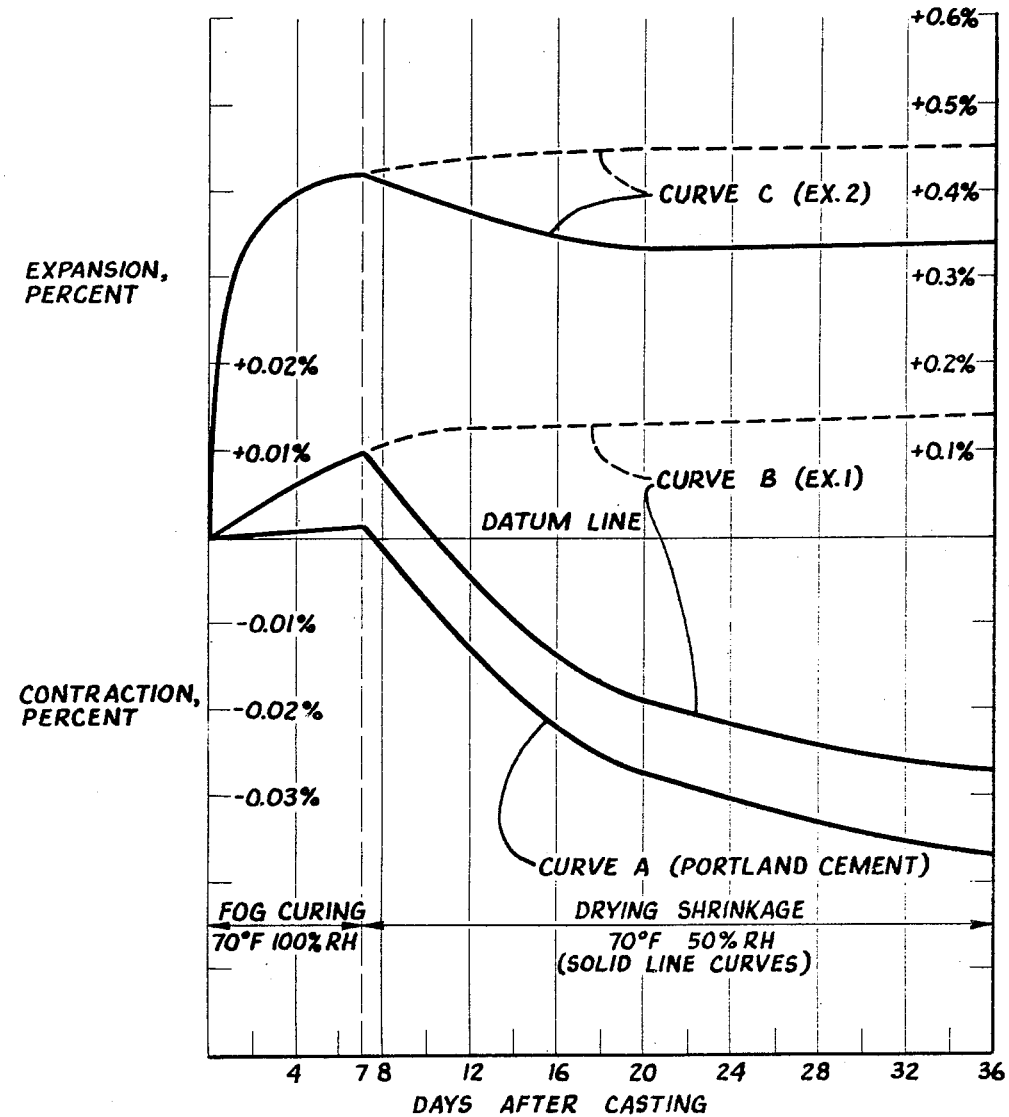
INVENTOR.
ALEXANDER KLEIN
BY Gregg & Stidham
ATTORNEY

3,251,701
EXPANSIVE AND SHRINKAGE-COMPENSATED CEMENTS

Alexander Klein, Danville, Calif., assignor to Chemically Prestressed Concrete Corp., Van Nuys, Calif., a corporation of California
Filed Sept. 24, 1964, Ser. No. 398,973
Claims priority, application Canada, July 27, 1964, 908,118
7 Claims. (Cl. 106—89)

This invention relates to hydraulic cements.

This application is a continuation-in-part of my co-pending application Serial No. 145,964, filed October 18, 1961, entitled "Expansive Cements" now U.S. Patent No. 3,155,526, granted November 3, 1964, and of my co-pending application Serial No. 300,874, filed August 8, 1963, entitled "Expansive and Shrinkage-Compensated Cements."

In my copending application Serial No. 145,964 referred to above I have described a cement having an ordinary Portland cement component (a) and an expansive component (b). The expansive component (b) consists for the most part of a stable calcium sulfo aluminate $(CaO)_4(Al_2O_3)_3SO_3$ in the form of a ternary system or complex with extractable associated lime (CaO) and extractable associated anhydrous calcium sulfate $(CaSO_4)$, the extractable lime being determined by the method of ASTM C114–58 and the associated anhydrous calcium sulfate being determined by the method of Forsen as modified by Manabe and published in A.C.I. Journal, vol. 31, No. 7, January 1960 under the title "Determination of Calcium Sulfoaluminate in Cement Paste by Tracer Technique." In the specific embodiments of the invention therein described, the expansive component (b) is prepared as a separate clinker by preparing a mixture of suitable materials (e.g., limestone, gypsum and bauxite) which provide the oxides CaO, $SO_3$ and $Al_2O_3$, the proportions being such as to form, on appropriate burning, a complex or system including a stable calcium alumino sulfate, and burning this mixture at a suitable temperature, e.g., about 2500° F. The resulting clinker is ground and mixed with the Portland cement component (a), or this expansive clinker and Portland cement clinker are interground. In either case, in the foregoing embodiment of my invention, a mechanical mixture results in which there are discrete particles (a) of Portland cement and discrete particles (b) of expansive component. Depending upon the proportion of (b), the cement blend of (a) and (b) is either (1) shrinkage compensated (i.e., shrinkage stresses which occur during drying and/or curing of concrete are compensated in part or in whole by compressive stresses developed through restraint of expansion due to (b)) or (2) it has a net expansion sufficient under restraint to develop a relatively high degree of compressive prestress of concrete.

Such phenomena are useful to prevent, or to inhibit cracking of concrete due to drying shrinkage or to bring about prestressing of reinforcement members by reason of expansion of concrete. The mechanism involved is believed to be as follows: Assume a concrete slab such as concrete pavement. For the sake of simplicity assume also that the slab contains no reinforcement steel. Nevertheless both expansion and contraction of the slab are restrained to some degree by the subgrade. (Reinforcement steel, forms, etc. also exert restraint where they are present.) If the slab expands, restraint opposes expansion and causes a compressive stress in the concrete, the magnitude of which is related to the net expansion which is produced and to the degree of restraint. If the slab shrinks the restraint resists shrinkage and sets up a tensile stress in the concrete, the magnitude of which is related to the shrinkage produced and to the degree of restraint. Assume now that sufficient expansive component (b) has been added to (or has been included in) Portland cement to cause, under a given restraint, an initial expansion of the concrete slab before drying shrinkage occurs. Therefore, a compressive stress will be produced in the concrete, the magnitude of which for a given degree of restraint varies with the magnitude of the expansion, such stress being in opposition to restraint of the subgrade. On subsequent drying shrinkage this compressive stress may be relieved but, if the compressive stress is not completely relieved the slab will remain in compression and it will not develop cracks due to drying shrinkage because there is no net shrinkage and no tensile stress. If the drying shrinkage exactly equals the initial net expansion, under restraint again there will be no tensile stress, hence no drying shrinkage cracks. Even if the subsequent drying shrinkage exceeds the initial expansion but the drying shrinkage is small and the resultant tensile stress is small and does not exceed the tensile strength of the concrete slab, there will be no (or very few) shrinkage cracks.

It will be apparent that, by using an appropriate quantity of expansive component with Portland cement, a shrinkage compensated concrete (i.e., a concrete which is free of shrinkage cracks, or which has fewer such cracks) can be produced; or if desired, a concrete can be produced which has a substantial net expansion and is, therefore, self-stressing under adequate and appropriate restraint.

It is an object of the present invention to provide a means whereby cements for both shrinkage compensated concrete and prestressing expansive concretes can be prepared without the need to prepare a special expansive component (b) and to subsequently blend or intergrind such component with Portland cement (a).

Among the advantages of a manufacturing method and of an end product which satisfy this object are the following:

If a cement of the character described is prepared as a blend of Portland cement and expansive additive to impart expansive or shrinkage compensated properties to the blend, additional plant facilities will have to be provided to prepare the expansive additive, or normal operation of a Portland cement plant will have to be stopped or modified from time to time to permit the manufacture of the expansive additive. By manufacturing the desired end product without the necessity of manufacturing a special additive, this difficulty is substantially avoided.

Also, by selecting raw materials and a method of processing the same which result in the desired end product (a Portland-type raw mix modified to produce a cement capable of forming a shrinkage compensated or a prestressing concrete), problems of matching the quantities and fineness of an additive material with various Portland cements are obviated. For example, the quantity of expansive additive required to produce, say, a shrinkage-compensated concrete may vary between Portland cements of different compositions. Also, the optimum fineness of the additive component may vary with the fineness of the Portland cement, and the fineness of Portland cement may vary from mill to mill and with the ASTM type of cement. Other advantages will be made apparent by the following description.

I have discovered that a clinker can be produced which contains both (a) Portland cement-type compounds such as tricalcium silicate and/or dicalcium silicate in quantity sufficient to make the clinker (when suitably ground) an hydraulic cement comparable to a Portland type cement and (b) a calcium alumino sulfate system or complex which is of a character and is in such proportion that concrete made from the cement is either shrinkage-compensated or expansive depending upon the proportions of (a) and (b). When such a clinker is ground in the usual manner to a fineness comparable to that of typical Portland cement, each particle contains both components (a) and (b) in the same general proportion as all other particles. This can be demonstrated, and the cement can be distinguished from mechanical blends of (a) and (b), by well known means such as examination with a petrographic microscope (which reveals homogeneity or heterogeneity of the particles), by measurement of index of refraction, by resistance to flotation separation and by centrifuging in a heavy liquid having a density between that of the known Portland cement type components (a) (typically about 3.2) and expansive components (b) (typically about 2.8).

It is to be understood that I do not exclude the addition of a separately prepared expansive component (e.g., the calcium alumino sulfate complex as described in my copending application Serial No. 145,964) to my integral or homogeneous cement to increase its expansiveness; nor do I exclude the addition of my integral or homogeneous cement to ordinary Portland cement to diminish or eliminate drying shrinkage of concrete or to produce prestressing concrete.

In accordance with my present invention I prepare a clinker including in its compound composition (a) one or more Portland cement type compounds which are predominately tricalcium silicate [$(CaO)_3SiO_2$ or $C_3S$ in accordance with Portland cement nomenclature] and/or dicalcium silicate [$(CaO)_2SiO_2$ or $C_2S$], such being present in quantity sufficient to give the clinker, when suitably ground hydraulic properties typical of Portland type cement; and (b) a stable calcium alumino sulfate, $$(CaO)_4(Al_2O_3)_3SO_3[C_4A_3\bar{S}$$

in the Portland cement nomenclature]; each of these being present in significant amount.

In the preferred embodiment of the present invention, the Portland cement compounds (a) are low in $C_3A$ (tricalcium aluminate) and the expansive compound (b) contains substantial extractable lime (extractable by the method of ASTM (C114–58) and $CaSO_4$. It is this complex ($C_4A_3\bar{S}$+extractable lime (C) and anhydrous calcium sulfate ($C\bar{S}$)) which is believed to impart expansive properties to the cement. Thus, as stated by Halstead and Moore, in a paper entitled "The Composition and Crystallography of an Anhydrous Calcium Aluminosulphate Occurring in Expanding Cement," published in Journal of Applied Chemistry, dated September 1962, vol. 12, pages 413–417, at page 417, the stable compound $4CaO, 3Al_2O_3, SO_3(C_4A_3\bar{S})$ "contains alumina in excess of what is required for either of the calcium sulphoaluminate hydrates, and would therefore require both extra lime and extra $SO_3$ for total utilization of its expansive potential."

Thus for achieving maximum potential expansion, there should be substantial amounts of lime and calcium sulfate. However, the presence in the clinker of calcium alumino sulfate without lime and calcium sulfate, is useful because it will result in more rapid development of strength of concrete made from the cement; or because the reactants which form it will make possible a lower burning temperature in manufacture of the clinker; or because the inclusion in the raw mix of the ingredients which react to produce the calcium alumino sulfate will allow a wide choice of raw materials, e.g., crude kaolin or highly aluminous clay. Also, by grinding such a clinker containing calcium alumino sulfate but no associated lime and no associated calcium sulfate with, for example, 5–15% of gypsum, expansive properties can be imparted because lime is released upon hydration of the calcium silicates, and therefore both calcium sulfate (added as gypsum) and lime (supplied by hydration of calcium silicates) will be furnished.

The clinker (and the integral or homogeneous cement made by grinding the clinker) of my present invention ranges, with respect to the calcium alumino sulfate content, from a clinker containing a significant amount (e.g., 10% or more) of $C_4A_3\bar{S}$ with little or no extractable lime (CaO) and/or little or no anhydrous calcium sulfate, to a clinker containing enough lime and anhydrous calcium sulfate to achieve the full expansive potential of the calcium alumino sulfate.

Typically, to produce a clinker in accordance with my present invention, I prepare a mixture of a source of calcium oxide (C), a source of silica (S), a source of alumina (A) and a source of $SO_3$ ($\bar{S}$) and I burn this mixture in a kiln as in the usual manufacture of Portland cement clinker, although at a somewhat lower temperature preferably not above about 2900° F. A suitable mixture is limestone (as a source of C), gypsum (as a source of C) and $\bar{S}$, kaolin (as a source of alumina, A and of silica, S). Iron oxide ($Fe_2O_3$) will generally be present as an impurity in the raw materials. Additional iron oxide may be added for such purposes as reduction of $C_3A$ content. Also siliceous limestone (a source of both C and S), aluminous chalk (a source of both C and A), siliceous bauxite (a source of S and A) and aluminous clay (a source of A and S) may be mixed in proper combinations and proportions. Such mixtures are burned at temperatures to bring about or approach incipient fusion, i.e., sufficient to form the desired compounds (the calcium silicates and calcium alumino sulfate).

I have derived a set of equations (which are comparable to the well known Bogue equations applicable to conventional Portland cement) which enable me to calculate, with a good degree of approximation, the compound composition of my clinker based upon the oxide composition of the starting materials. In connection with these equations, it has been found that $Fe_2O_3$ (F in the usual nomenclature) will be taken up as a ferrite phase, probably $C_6A_2F$ because of the high alumina content of the clinker. Also, greater accuracy is achieved by excluding $TiO_2$ (if present) from the alumina (with which it is commonly included). On this basis, my equations are as follows:

(1) $C_6A_2F = 4.39F$
(2) $C_4A_3\bar{S} = 2.00A - 2.56F$
(3) $C\bar{S} = 1.70\bar{S} - 0.45A + 0.57F$
(4) Extractable CaO ($C_E$) = observed extractable CaO by method of ASTM C114–58
(5) Total expansive complex or system = $1.70\bar{S} + 1.55A - 2.00F + C_E$ The net CaO ($C_{net}$) available to form $C_3S$ and $C_2S$ with silica is calculated from the following equation (in which $C_{total}$ is the total CaO as determined by analysis or by formulation of the raw mix):

(6) $C_{net} = C_{total} - 0.70\bar{S} - 0.56A - 1.40F - C_E$

The proportions of $C_3S$ and $C_2S$ are then given by the following equations:

(7) $C_3S = 4.07C_{net} - 7.60S$
(8) $C_2S = 2.87S - 0.75C_3S$

It will be understood that these equations (like the Bogue equations) are approximate and that the compound analysis of the cement of my invention will be influenced by various factors including the nature and amounts of impurities and the conditions of burning. But in any case each particle of the ground clinker will contain (a) one or more calcium silicates of the type present in Portland cement in quantity sufficient to make an hydraulic cement, and (b) a significant amount of calcium sulfoaluminate which in the preferred embodiment of the invention is associated with sufficient lime and $CaSO_4$ to be expansive enough to compensate for shrinkage of the calcium silicates or to bring about a net expansion.

Typically, the integral cements of the present invention have the following range of compositions:

TABLE I

| Component | Amount (percent by wt.) | |
| --- | --- | --- |
| | Broad range | Preferred range |
| $C_4A_3\bar{S}+C\bar{S}+C_E$ | 10-90 | 10-50 |
| $C_3S+C_2S$ | 10-90 | 50-90 |
| Ferrite phase (most probably $C_6A_2F$ or $C_6AF_2$) | 0-20 | 0-20 |

If $C_3A$ is not zero, then Table I should be modified as follows:

TABLE I-A

| Component | Amount (percent by wt.) | |
| --- | --- | --- |
| | Broad range | Preferred range |
| $C_4A_3\bar{S}+C\bar{S}+C_E$ | 10-90 | 10-50 |
| $C_3S+C_2S$ | 10-90 | 50-90 |
| $C_3A$ | (1) | (1) |
| $C_4AF$ | 0-15 | 0-15 |

1 Up to about 5.

The following specific examples will serve further to illustrate the present invention.

Example 1

The raw materials were Whiting grade calcium carbonate, high purity gypsum, high purity kaolin, high grade silica and pure iron oxide having analyses as given in Table II below wherein percentages are by weight and on an ignited basis:

TABLE II

| Oxide | Whiting-grade limestone | Silica | Kaolin | Gypsum | $Fe_2O_3$ |
| --- | --- | --- | --- | --- | --- |
| $SiO_2$ | 0.9 | 98.1 | 53.2 | | |
| $Al_2O_3$ | 0.3 | | 46.3 | | |
| $Fe_2O_3$ | 0.3 | | | | 100.0 |
| CaO | 97.6 | | | 41.0 | |
| MgO | 0.9 | | | | |
| $SO_3$ | | | | 58.5 | |
| Alkalis and undetermined | | 1.9 | 0.5 | 0.5 | |
| Loss on ignition used in the calculation to ignited basis | 43.45 | 0.34 | 14.00 | 19.80 | 0.00 |

These raw materials were mixed in the proportions indicated in Table III.

TABLE III
RAW MIX PROPORTIONS, RAW BASIS, PERCENTAGES BY WEIGHT

Limestone _____ 59.89
Silica _____ 2.53
Kaolin _____ 22.19
Gypsum _____ 13.76
Iron oxide _____ 1.63

The iron oxide was added in amount comparable to that which would be introduced as an impurity by the usual industrial raw materials.

This mixture was ground to a fineness of 80 percent finer than a No. 325 standard sieve and was then mixed with water and formed into cakes about ¼ inch thick and 2 inches square. These cakes were burned in a Globar electric furnace at 2650° F. Calculated and actual (as determined by analysis) oxide compositions of the burned mixture or clinker were as follows:

TABLE IV

| Oxide | Calculated potential oxide composition | Actual oxide composition after burning at 2,650° F. in Globar electric furnace |
| --- | --- | --- |
| $SiO_2$ | 19.0 | 18.6 |
| $Al_2O_3$ | 13.1 | 13.0 |
| $Fe_2O_3$ | 2.5 | 2.3 |
| CaO | 55.1 | 54.9 |
| MgO | 0.5 | 0.9 |
| $SO_3$ | 9.5 | 9.3 |
| Loss on ignition | 0.0 | 0.5 |
| Alkalis and undetermined | 0.3 | 0.5 |
| Total | 100.0 | 100.0 |
| Observed extractable CaO (ASTM C114-48) | | 0.5 |
| $CaSO_4$ [1] | | 2.8 |

[1] As determined by method of Forsen as modified by Manabe; see A.C.I. Journal, vol. 31, No. 7, January 1960.

Example 2

The same raw materials were employed as in Example 1 but in the proportions shown in Table V:

TABLE V

Limestone _____ 64.32
Silica _____ 1.81
Kaolin _____ 18.71
Gypsum _____ 13.56
Iron oxide _____ 1.60

This mixture was processed as in Example 1 except that it was divided into a relatively small portion which was burned in a Globar electric furnace at 2500° F. and a major portion which was burned in a rotary kiln at 2500° F. Calculated and observed oxide compositions of the clinker were as follows:

TABLE VI

| Oxide | Calculated potential oxide composition | Actual oxide compositions after burning at 2,500° F. in— | |
| --- | --- | --- | --- |
| | | Globar electric furnace | Rotary kiln |
| $SiO_2$ | 15.9 | 15.6 | 15.7 |
| $Al_2O_3$ | 11.3 | 11.3 | 11.7 |
| $Fe_2O_3$ | 2.5 | 2.0 | 2.4 |
| CaO | 59.9 | 60.2 | 59.4 |
| MgO | 0.5 | 0.3 | 0.1 |
| $SO_3$ | 9.5 | 9.3 | 9.2 |
| Loss on ignition | | 0.9 | 0.6 |
| Alkalis and undetermined | 0.4 | 1.4 | 0.9 |
| Total | 100.0 | 100.0 | 100.0 |
| Observed extractable CaO (ASTM C114-58) | | 8.9 | 10.8 |
| $CaSO_4$ (modified Forsen method) | | 4.4 | 3.8 |

Referring to Tables IV and VI, free calcium sulfate was determined by the method of Forsen using saturated lime water as described in A.C.I. Journal, vol. 31, January 1960. Extractable CaO and all other oxides present were determined by accordance with ASTM C114–58 specifications for analysis of Portland cement. The "Forsen" value of $CaSO_4$ is not, however, a measure of total available $CaSO_4$; i.e., there is more $CaSO_4$ in the cement which is available to combine with the excess alumina in $C_4A_3\bar{S}$ to bring about further expansion.

Applying Equations 1 through 8 hereinabove, the cements of Examples 1 and 2 have the following compound analyses:

TABLE VII

| Compound | Cements of— | |
|---|---|---|
| | Ex. 1 | Ex. 2 |
| $C_4A_2F$ (most probable composition of ferrite phase) | 10.1 | 8.8 |
| $C_4A_3\bar{S}$ (calcium alumino sulfate) | 19.8 | 16.7 |
| $C\bar{S}$ | 11.5 | 12.1 |
| $C_E$ (extractable lime, ASTM C114–48) | 0.5 | 8.9 |
| $C_3S$ | 11.9 | 27.9 |
| $C_2S$ | 44.4 | 23.7 |
| $TiO_2$ plus MgO plus alkalies plus loss on ignition plus undetermined | 2.3 | 2.0 |
| | 100.0 | 100.0 |
| Total expansive complex ($C_4A_3\bar{S}+C\bar{S}+C_E$) | 31.3 | 37.7 |

These examples show that a substantial amount of expansive calcium alumino sulfate complex is formed in the cement clinker but that the composition of the clinker (excluding the calcium alumino sulfate complex) may be typical of Portland cement compositions over the full range of proportions of $C_3S$ and $C_2S$ as found in Portland cement produced throughout the world.

*Example 3*

Using clinkers prepared in the Globar electric furnace, a quantity of the clinker of Example 1 and a quantity of the clinker of Example 2 were ground separately in a ball mill to a fineness of 3100 square centimeters per gram as measured by the air permeability method of ASTM C204–55. Concrete mixes were prepared from each of these ground clinkers as follows:

7 sacks of ground clinker per cubic yard of concrete (no gypsum added during grinding).
Water-to-ground clinker ratio equal 0.385 by weight.
A mixture of local sand and gravel was used as aggregate, having a maximum size of ¾ inch.
The sand constituted 40 percent of the total aggregate by weight.

Bars were cast from these concretes having a cross sectional shape of 2 inches by 2 inches and a length of 12 inches. Each bar was provided with gage points on two opposite faces to provide a gage length of 10 inches to allow measurements wtih a Whittemore gage of axial change of length.

All specimens were cured in fog at 70° F. and 100% relative humidity to age 7 days. Thereafter half of each set of specimens was subjected to drying at 70° F. and 50% relative humidity. The other half of each set was subjected to the same curing conditions (fog, 70° F., 100% relative humidity) as during the first 7 days.

The results are set forth in the single drawing. Referring to this drawing abscissae indicate age after casting and ordinates represent percentage expansion or shrinkage. As shown, there is a zero datum line indicating the length of the bar at the commencement of curing. Points above this datum line indicate expansion whereas points below indicate shrinkage. Curve A represents the behavior of bars prepared in identical manner but using conventional Portland cement. Curve B represents the behavior of bars made from the cement of Example 1 (relatively high $C_2S$). The solid portion of Curve B which is to the right of the 7-day abscissa corresponds to curing at 50% relative humidity and 70° F. The broken line portion of Curve B corresponds to continuous curing in fog at 70° F. and 100% relative humidity. Curve C represents the behavior of bars prepared with Globar-burned cement of Example 2 (relatively high $C_3S$). As in the case of Curve B the solid portion of the curve to the right of the 7 day abscissa corresponds to curing at 70° F. and 50% relative humidity in the absence of fog whereas the broken line portion thereof corresponds to continuous curing at 70° F. in fog at 100% relative humidity. It should also be noted that the scales for Curves A and B appear on the left and the scale for Curve C on the right.

As noted above, no gypsum was added to the clinker of Example 3 during grinding. The significance of this is as follows: In the manufacture of Portland cement it is customary to add about 5% of gypsum during grinding of the clinker, to act as a retarder. This dilutes the cement by 5%. I have found that the addition of gypsum as a retarder is unnecessary in the case of the cements of my present invention. This represents, therefore, an additional advantage of the cements of my invention. It may, however, be desirable to add gypsum for reasons other than retarding, such as to provide optimum control with respect to compressive strengths, drying shrinkage or expansive potential.

*Example 4*

The cement of Example 1 has, as the calcium silicate phase, predominantly beta dicalcium silicate, whereas the cements of Example 2 have more nearly equal parts of tricalcium silicate and beta dicalcium silicate. I have found that by increasing the proportion of tricalcium silicate in the cement of the type herein described (i.e., a cement containing calcium alumino sulfate as the expansive agent) the magnitude of expansion can be increased and also the rate of expansion. There is set forth below in Table VIII the calculated proportions by weight of ingredients suitable for preparing a high tricalcium silicate highly expansive cement for use either in shrinkage compensation or in prestressing cements, depending upon the richness of mix in the concretes.

TABLE VIII

| | |
|---|---|
| Limestone | 72.0 |
| Kaolin | 15.0 |
| Gypsum | 11.5 |
| Iron oxide | 1.5 |

Calculations have indicated that a cement prepared by the method described hereinabove from such a mixture of raw materials would have a potential oxide composition as shown in Table IX and a potential compound composition as shown in Table X.

TABLE IX

| Oxide: | Percent by wt. |
|---|---|
| $SiO_2$ | 11.2 |
| $Al_2O_3$ | 9.5 |
| $Fe_2O_3$ | 2.5 |
| CaO | 67.7 |
| MgO | 0.6 |
| $SO_3$ | 8.4 |
| Alkalies and undetermined | 0.4 |
| | 100.0 |

TABLE X

| Compound: | Percent by wt. |
|---|---|
| $C_6A_2F$ (most probable composition of ferrite phase) | 11.0 |
| $C_4A_3\bar{S}$ (calcium alumino sulfate) | 12.0 |
| $C\bar{S}$ | 11.6 |
| $C_E$ (extractable lime, ASTM C114–58) | 21.7 |
| $C_3S$ | 42.6 |
| $C_2S$ | Little or none |
| $TiO_2+MgO+$alkalies$+$loss on ignition$+$undetermined | 1.0 |
| Total expansive complex $(C_4A_3\bar{S}+C\bar{S}+C_E)$ | 45.3 |

In the examples hereinabove the raw materials were of a relatively pure character. Thus, high grade limestone (Whiting grade) was employed as the source of calcium oxide, high grade kaolin as the source of alumina and silica and high grade gypsum as the source of $SO_3$ and as an additional source of calcium oxide. Also, reagent quality iron oxide was added as a means of reducing the $C_3A$ content, to permit clinkering at lower temperatures and to simulate iron oxide impurities in industrial raw materials.

It is not necessary that such high grade ingredients be employed. For example, a siliceous limestone may be used to provide both calcium oxide and silicon dioxide. Aluminous chalk, siliceous bauxite and clays can be used to provide two or more of the essential oxides. Thus, aluminous chalk would provide both alumina and calcium oxide; siliceous bauxite would provide both silica and aluminum oxide. In fact, it is an advantage of the present invention that it makes possible the employment of raw materials having impurities which would preclude their use in the manufacture of conventional Portland cement.

It will, therefore, be apparent that I have provided a cement characterized by the fact that the clinker from which the cement is made by grinding, and each particle of the cement, contains significant proportions each of (a) one or more calcium silicates of the type which act as an hydraulic cement and (b) a stable calcium alumino sulfate. The clinker or cement particles preferably also contain substantial lime and $CaSO_4$ associated with and as a part of the system or complex (b) but they may be deficient or absent in which case the lime may be supplied by release during hydration of the calcium silicates, and the calcium sulfate may be added in the form of gypsum. In those cases where there are substantial amounts of calcium silicates (a), the cement is a complete cement ready for use in the manner of Portland cement. In those cases where the calcium alumino sulfate phase or complex predominates the cement may be added to Portland cement to compensate for drying shrinkage or to make the Portland cement expansive.

The cements of the present invention may not only be used as such or added to Portland cement but they may be added to other hydraulic cements such as calcium aluminate cements, Rosendale cements, Portland-pozzolan cements, Portland-blast furnace slag cements, etc. Also, in the cements of the present invention, the calcium silicate compound or compounds (a) may be replaced in part or in whole by calcium aluminates such as $C_{12}A_7$, CA, $CA_2$ and other compounds of calcium aluminate binary systems; such being accomplished by suitable choice of starting materials.

I claim:

1. A cement composition which in clinker form contains and wherein in the form of ground cement each particle contains (a) at least one silicate of the type present in Portland cement and having the properties of an hydraulic cement and (b) a stable calcium alumino sulfate in the form of a ternary compound $$(CaO)_4(Al_2O_3)_3(SO_3)$$

said silicate component (a) being present in sufficient proportion that the cement composition is a Portland type, hydraulic cement; said component (b) being present in such quantity that, in the presence of sufficient CaO and $CaSO_4$, it will compensate for at least a substantial part of the drying shrinkage of concrete produced by admixture of the cement with mineral aggregate and water.

2. A cement composition in accordance with claim 1 wherein the compound composition is as follows:

| | Percent by weight |
|---|---|
| (a) Calcium silicate component | 50–90 |
| (b) Calcium alumino sulfate compenent$+$(where present) associated $C\bar{S}$ and associated extractable CaO | 10–50 |

3. The cement composition of claim 1 wherein said component (b) is associated with a sufficient amount of CaO extractable by the method of ASTM C114–58 and of $CaSO_4$ to bring about substantial expansion of the calcium alumino sulfate upon hydration.

4. The cement composition of claim 3 wherein the proportion of (b) plus said CaO and $CaSO_4$ to (a) is such that drying shrinkage of concrete produced by admixture of the cement with mineral aggregate and water, is substantially compensated.

5. The cement composition of claim 3 wherein the proportion of (b) plus said CaO and $CaSO_4$ to (a) is such that drying shrinkage of concrete produced by admixture of the cement with mineral aggregate and water is not only compensated but a net expansion of the concrete results.

6. A method of making a Portland-type cement which comprises providing a mixture of a source of CaO, of $SiO_2$, of $Al_2O_3$ and of $SO_3$ in such proportions that, on burning in a kiln to form a clinker at a temperature not in excess of about 2900° F., at least one silicate selected from the group consisting of dicalcium silicate and tricalcium silicate is formed in quantities sufficient to produce an hydraulic, Portland-type cement when the clinker is ground, and also to form a substantial proportion of a stable calcium alumino sulfate in the form of a ternary compound $(CaO)_4(Al_2O_3)_3(SO_3)$, said proportion being such that the calcium alumino sulfate in the presence of sufficient CaO and $CaSO_4$ compensates for at least a substantial part of the drying shrinkage of concrete produced by admixture of the cement with mineral aggregate and water; said method comprising heating the said mixture under conditions to form such a clinker including the stated amount of silicate component and of stable calcium alumino sulfate.

7. The method of claim 6 wherein the proportions of source materials for CaO, $SiO_2$, $Al_2O_3$ and $SO_3$ are such that a clinker is formed having the following characteristics:

(1) it contains a major proportion of dicalcium silicate-tricalcium silicate component and, when ground to a fine particle size, is essentially a Portland-type cement, (2) it contains associated CaO and $CaSO_4$ sufficient to substantially fully develop the expansive potential of said stable calcium alumino sulfate.

References Cited by the Examiner

FOREIGN PATENTS 485,135   7/1952   Canada.
647,156   12/1950   Great Britain.

OTHER REFERENCES

Lea and Desch, The Chemistry of Cement and Concrete, Edward Arnold Ltd., London, 2nd edition, 1956, pages 198–202, 151–161 (151–153 in particular).

TOBIAS E. LEVOW, *Primary Examiner.*

SAMUEL H. BLECH, *Examiner.*